United States Patent [19]
Oehmke et al.

[11] 3,798,837
[45] Mar. 26, 1974

[54] BIO-ACTIVE SILVICULTURAL CONTAINER
[75] Inventors: Richard W. Oehmke, Hudson, Wis.; Ronald F. Oestead, Maplewood; Edward W. Janssen, Roseville, both of Minn.
[73] Assignee: Minnesota Mining and Manufacturing Company, St. Paul, Mich.
[22] Filed: Feb. 26, 1973
[21] Appl. No.: 335,729

[52] U.S. Cl.............. 47/37, 71/64 F, 220/DIG. 30, 220/83, 47/57.6
[51] Int. Cl............................................. A01g 9/02
[58] Field of Search............. 47/1, 37, 34, 56, 57.6, 47/34.13; 220/DIG. 30, 83; 206/46 PL; 229/87 P; 71/64 F

[56] References Cited
UNITED STATES PATENTS
1,446,113  2/1923  Blackwell............................... 47/34
1,959,139  5/1934  Otwell..................................... 47/37
2,688,209  9/1954  Adams..................................... 47/37
3,331,155  7/1967  Chancellor............................. 47/37
3,415,402  12/1968  Webber...................... 220/DIG. 30
3,534,497  10/1970  Hornbostel............................ 47/37
3,647,111  3/1972  Stager et al................. 220/DIG. 30
3,736,889  6/1973  Reid....................................... 47/37

*Primary Examiner*—Robert E. Bagwill

[57] ABSTRACT

A silvicultural container is provided which is useful for the germination of seeds and nurturing of seedling plants until such time as they are transplanted, container and all, into the field. The container is of such construction and composition that it can be triggered to provide a balanced nutrient source for soil bacteria and the delicate young seedling at the time of transplantation.

9 Claims, 3 Drawing Figures

PATENTED MAR 26 1974 3,798,837

BIO-ACTIVE SILVICULTURAL CONTAINER

This invention relates to containers useful for the germination of seeds and nurturing of seedling plants.

For many years the forest products industry has experimented with the concept of containerized planting of tree seedlings as opposed to the usual method of bareroot planting. It is the usual procedure in both methods to nurture the young seedling in a greenhouse or similarly protected area for the first four to six months of its growth. At this point, in the bareroot method, the seedlings are dug up and transplanted to a nursery plot for one or two years after which they are dug up again and the roots wrapped in a moist material for transport to the planting area. In the containerized system, however, the young seedling is transported during the first year of its growth, in the original container in which the seedling was germinated and grown, to the planting area where the seedling is transplanted, container and all. The containerized method obviously causes much less shock to the system of the young plant and provides economic advantages with respect to labor and space. A number of different forms of cardboard and paper or plastic containers have been tested, but all have exhibited one or more drawbacks.

Attempts to provide paper plant containers which would initially retain the young plant in the greenhouse and then disintegrate upon, or after, transplanting have a relatively long history. For example, U.S. Pat. No. 607,346 describes a simple paper box, so designed that the flaps forming the bottom could be opened and turned up and back before planting in the soil. U.S. Pat. No. 1,200,396 describes an improved paper container provided with preformed slots or weak areas in the walls so that the roots of the growing plant could more easily force their way out into the surrounding soil. The design of the container described in U.S. Pat. No. 1,828,448 was such that the box could be shipped flat and easily assembled at the point of use by unskilled labor. One of the major drawbacks of the type of plant containers described in the foregoing patent is that the decay processes upon which the penetration and escape of the roots into the surrounding soil depend are difficult to control. Containers of this type either allow the passage of roots through the walls thereof before transplanting or are not sufficiently permeable to the roots after transplantation.

A plant container aimed at the solution of this problem is described in U.S. Pat. No. 2,567,706. The construction described there consists of a very low wet strength, porous paper walled container, the inside surface of which is first sized with a glue and then given a frangible coating of polystyrene. At transplant time, the outside of the container, composed of low wet strength paper, allegedly disintegrates rapidly in the presence of moisture, thus destroying the supporting structure for the frangible coating of polystyrene. One drawback with this type of container is that it must be protected from moisture until the desired time for disintegration. To accomplish this a grid-like cover system is devised to protect the container from premature disintegration when the plants are watered.

U.S. Pat. No. 2,688,209 describes a plant container or band with an exterior coating which is impenetratable to roots, but which after being in contact with the soil for a period of time becomes sufficiently embrittled so that it can be easily fractured at the time of transplanting, thus allowing the roots access to the soil outside of the pot. One difficulty with this concept is the dependence of the embrittlement of the coating on reaction with the soil and soil organisms. Another disadvantage inherent with this container is that the decomposition of the cellulosic materials of the walls by soil organisms requires nutrient substances such as nitrogen and phosphorous compounds. The result is a competition between the soil organisms and the young seedling for the nutrient substances which are essential for the young seedling growing in its new growing site.

Others have proposed rigid plastic seedling containers, e.g., those known in the forest products industry as "Ontario Tubes" or "Walther's Bullets." Rigid plastic rubes are also described in U.S. Pat. No. 3,302,325. Although, as shown by the work of Chedzoy [Tree Planters Notes 18, p. 1–3 (1967)] the seeds germinate better in plastic tubes because of the improved drainage, these containers are too rigid to be cracked apart and are very resistant to degradation let alone rapid disintegration in the soil. This creates several problems in the field. There is, first of all, the problem of restricted or uneven root developement. Attempts have been made to provide holes and slits for egress of the roots, but these have met with limited success. In the northern climates, if sufficient root growth outside of the tube has not taken place by autumn, the rigid tubes, like rocks and pebbles, are prone to being heaved from the soil by the frost. Of course, the seedling is heaved up with the rigid tube and as a consequence dies.

Thus, there has not heretofore been provided a plant container which is suitable for the germination of seeds and nurturing of seedling plants and which is practical for efficient and effective transplantation of seedling plants. The present invention provides such a construction.

SUMMARY OF THE INVENTION

In accordance with the invention there is provided a bio-active plant container comprising:
  a. a nutrient core member which has walls comprising:
    i. about 30–70 percent by weight of water-soluble, film-forming proteinaceous material,
    ii. about 10–20 percent by weight of carbohydrate,
    iii. about 5–15 percent by weight of phosphate salt, and
    iv. about 0–30 percent by weight of fibrous material, wherein the carbon-to-nitrogen ratio in said nutrient core member is less than about 12 to 1; and
  b. a frangible, water-insoluble shell encapsulating the walls of said nutrient core member.

Because the nutrient core is composed of proteinaceous material and bacterial culture media components, it provides a nutrient source for growing plants as well as for soil organisms which are necessary to slowly convert the proteinaceous material to nitrogen compounds which can be effectively used by the seedling. The core, which preferably contains a minor amount of fibrous material to lend reinforcement and dimensional stability, is encapsulated in a frangible waterproof shell which can be, if desired, biodegradable.

The frangible shell provides all of the drainage capability and root retention advantages of the conventional rigid plastic containers and exhibits the further advantage of being fracturable at will to expose the nutrient core. That is, the shell prevents the seedling from using the nutrients in the core member until such time as the shell is fractured and the seedling transplanted into the field. This is most useful because, while seedlings are easily and economically fertilized in the greenhouse, fertilization in the field is a costly, labor-consuming task.

The nutrient core exhibits the advantages of controlled release of plant nutrient, biodegradability, rapid disintegration in soil, and permitting easy and rapid root penetration therethrough. When the core is initially exposed (i.e., when the shell is fractured), the phosphate salt provides an immediate source of phosphate which encourages rapid root development in the seedling. Because the nitrogen in the core member is in protein form, its utilization by the seedling to produce foliage is delayed until after the roots are well established. This controlled release of nutrients also alleviates the danger, which is inherent in some prior art containers, of the fertilizer burning the root system of the plant.

Bacterial culture media can also be included in the core member to encourage the growth of bacteria which are able to convert the proteinaceous material to a nitrogen form which can be utilized by the growing seedling.

The seedling container is readily suitable for either machine or hand transplanting. The containers can be provided in an array (e.g., in honeycomb fashion).

DETAILED DESCRIPTION OF THE INVENTION

The invention is described in more detail hereinafter with reference to the following drawings wherein like reference characters refer to the same parts throughout the several views and in which.

Figure 1:
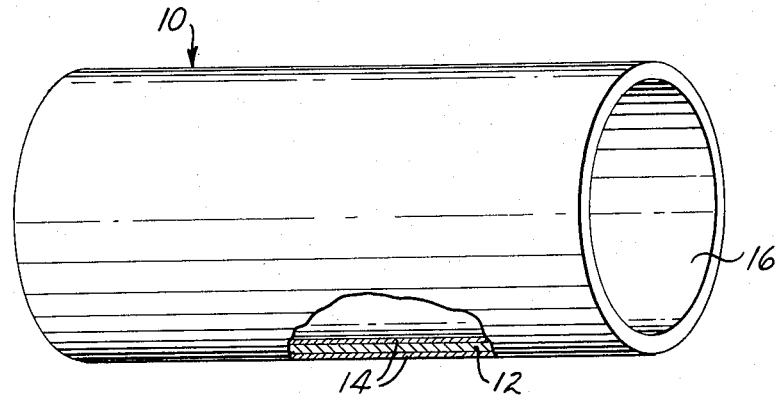
FIG. 1 is a plant container of the invention.

In FIG. 1 there is shown a plant container 10 comprising a nutrient core member 12 encapsulated with frangible shell 14. Core member 12 and shell 14 define a cavity 16 into which a seed or seedling may be placed, along with desired soil or other environment, when using the container.

Although the plant container 10 as shown is in the form of a hollow cylinder or tube, it is obvious that the container may have any geometrical shape, e.g., conical or tapered, square, rectangular, etc. Plant container 10 also may have more than one cavity, e.g., a honeycomb structure. The plant container may be of any size, depending upon its intended use, although it has been found that the length of about 10 cm. and a cavity of about 2 cm. in diameter is quite useful for most types of young seedlings.

Core member 12 comprises about 30–70 percent by weight of water-soluble, film-forming proteinaceous material such as hide glue, gelatin, casein, collagen, albumin, fish protein, vegetable proteins (e.g., soy protein). Ammonium nitrate, nitrophosphate, ammonium phosphate, urea and urea polymers (e.g., urea formaldehyde) may also be used as supplementary nitrogen sources. Preferred proteinaceous materials are hide glue, gelatin, and casein. Mixtures of these materials can also be used.

Core member 12 also comprises about 10–20 percent by weight of carbohydrate such as glucose, sorbitol, glycerine, corn syrup, and molasses. Preferred carbohydrates are glycerine and sorbitol.

Core member 12 further comprises about 5–15 percent by weight of phosphate salt, e.g., $K_3PO_4$, $K_2HPO_4$, $KH_2PO_4$, $Ca_3(PO_4)_2$, nitrophosphate, ammonium phosphate, and the product of phosphoric acid and calcium phosphate. Commonly used phosphate salts are $K_2HPO_4$ and $KH_2PO_4$. The carbohydrate and the phosphate salt serve as nutrients for seedings placed in the plant container and, together with the proteinaceous material, serve as nutrients for soil bacteria which convert the proteinaceous material to nitrogen compounds of a type which can be used by the growing seedling. In order to obtain nitrogen compounds (during the decomposition of the core member by soil organisms) which can be used efficiently by a growing plant, it is necessary for the carbon-to-nitrogen ratio of the core member to be less than about 12 to 1. It is known that ammonia is one of the materials produced during the decomposition of organic materials by soil organisms when the carbon:nitrogen ratio is less than about 12:1. See Burges, *Micro-Organisms in the Soil*, Hutchinson & Co. Ltd., London, 1958.

Core member 12 can also contain up to about 30 percent by weight of fibrous material for the purpose of improving the integrity or dimensional stability of the core walls. Representative of useful fibrous materials are wood pulp, cotton linters, bagasse, viscose rayon, polyester, polypropylene, polyethylene, etc. The fibrous material can be biodegradable if desired, although non-biodegradable material may be more advantageous in the sense that it does not require nitrogen or phosphorous for decomposition as does biodegradable material which relies upon the activity of soil organisms. Ground scrap leather is a preferred fibrous material because it is biodegradable and also serves as a source of nitrogen.

Frangible shell 14 which encapsulates core member 12 is water-insoluble or water-resistant and may be biodegradable, if desired. Shell 14 is typically about 0.1 to 2 mm. thick and is generally made from any of several well-known fracturable, water-insoluble materials, e.g., polystyrene, polyvinyl chloride, polyacrylates and methacrylates, crosslinkable polyester, natural and synthetic waxes, brittle tar and bituminous materials, alkyd resins, etc.

Figure 2:
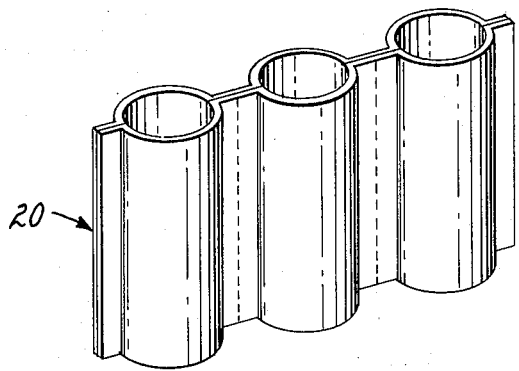
FIG. 2 is an array of a plurality of plant containers.
Figure 3:
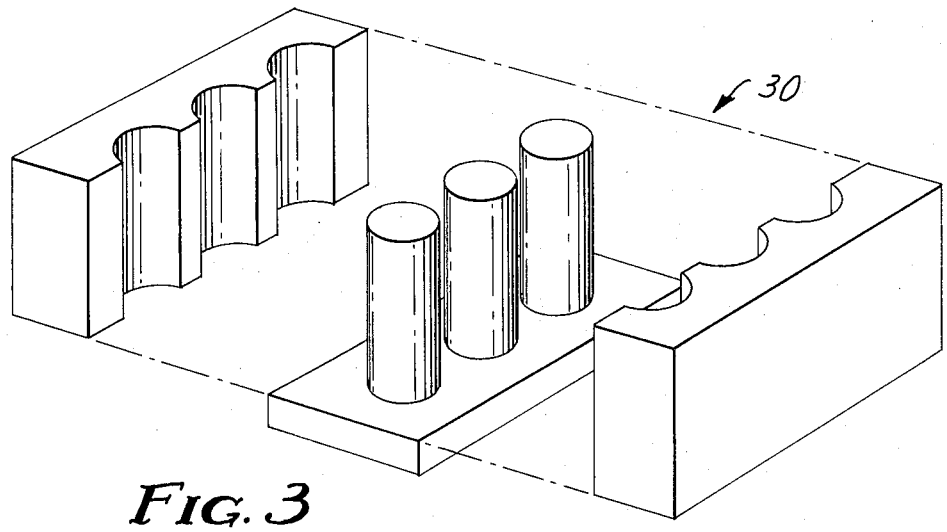
FIG. 3 shows a molding device for making one form of plant container.

The plant container is easily made by first blending proteinaceous material, carbohydrate, phosphate salt, fibrous material, and hot water in a conventional mixer. If sufficient hot water is used to form a fluid mixture, the blend may be simply cast as a film or sheet and allowed to cool, gel, and partially dry before being placed in a mold 30 of the type shown in FIG. 3. After placing in the mold 30, the assembled apparatus is placed in an oven and dried at 100°–200° F. to form an array 20 of containers of the type shown in FIG. 2. Alternatively, one may use a minor amount of water in the blend and utilize heat and pressure to mold and form the container in suitably designed compression or injection molding equipment.

Various processing aids may be included in the blend which are of assistance in the molding and forming operation and which also assist in mold release. Preferably these processing aids are solid water-dispersible thermoplastic materials, e.g., solid polyoxyethylene having a molecular weight in the range of about 1,000 to 1,000,000, which are used in amounts up to about 20 percent by weight of the core member, calculated on the dry basis. Typical of such materials is "Carbowax," commercially available from Union Carbide.

As another alternative one may form a blend of proteinaceous material, carbohydrate, phosphate salt and hot water, the blend then being used to saturate lightweight web materials such as cheese cloth, crepe paper, rayon scrim, nonwoven fabric, etc. in such a manner that the web represents less than about 30 percent by weight of the resulting core member. The so-impregnated web is formed or molded into tubes using, for example, the molding apparatus of FIG. 3.

After the core member has been formed, it is encapsulated in a frangible, water-insoluble shell by dipping, spraying, brush coating, etc., with molten or solvated material.

Depending upon the type of plants for which the plant container is to be used, one may vary the relative proportions of the various nutrients in the core member so as to provide for most efficient nurturing of the young plant. For example, containers used for growing and nurturing tomatoes, roses, and other flowering plants, preferably have core members wherein the ratio of nitrogen:available phosphoric acid:soluble potash is 1:2:1.

The invention is further illustrated by means of the following examples wherein the term "parts" refers to parts by weight unless otherwise indicated.

EXAMPLE 1

Sixty parts of hide glue, 16 parts of glycerine, and 40 parts of fish protein concentrate are dispersed in 320 parts of hot water. The fish protein concentrate, which is a balanced nutrient for both plants and soil organism, is of the following composition:

52% by weight protein
14% by weight ash
3% by weight fiber
2% by weight fat
2.5% by weight potassium
1.4% by weight sodium
1.2% by weight magnesium
1.0% by weight calcium
1.0% by weight phosphorus The balance of the composition is primarily water.

Pieces of cellulosic fiber nonwoven web (weight of 115 grams per square meter and measuring 10 cm. × 60 cm.) are soaked in and overcoated with the dispersion, allowed to partially dry and set-up, and then placed in a mold (of the type shown in FIG. 3) for heat forming and drying. The carbon-to-nitrogen ratio of the core obtained is less than about 12 to 1.

After drying, the structure obtained is encapsulated by dipping it into a molten mixture comprising 95 percent paraffin wax ("Shellwax 200") and 5 percent polyvinyl acetate ("Elvax EP3647-1") after which it is withdrawn and cooled. The frangible shell so obtained is about 1 mm. thick.

The plant containers so obtained were filled with and buried in a mixture of 50 percent sand and 50 percent vermiculite. About one tablespoon of garden soil was added to each container to provide a source of soil bacteria. A seed of corn was then planted in each tube and the soil kept moist as the seeds germinated and sprouted. After two weeks the corn was about 20 cm. high. The tubes where then dug up and examined, revealing that a minor number of roots had broken through the encapsulant. The encapsulating material was cracked by hand and the tubes replanted in the same type of growth media. After about six weeks the corn had grown to an average height of about 33 cm. and the roots had readily penetrated the container walls.

EXAMPLE 2

Eight parts of glycerol, 120 parts of dextrin, and 160 parts of hot water are mixed together. A nonwoven web of the type described in Example 1 is then impregnated with this dispersion, molded, dried, and coated with a frangible shell, all as described in Example 1. The carbon-to-nitrogen ratio of the core member is greater than 12 to 1.

The plant containers obtained were filled and buried according to the procedure of Example 1. After which a seed of corn was planted in each tube. After two weeks the container was dug up, the frangible shell broken, and the container reburied. After about six weeks the corn plants had only reached an average height of about 16 cm. The corn plants were not as healthy or vigorous as those grown in the containers described in Example 1.

EXAMPLE 3

Preparation of a Protein Hydrolysate

To 1500 ml. of water and 200 grams of "Colloid Protein 5V" (commercially available from Swift and Company) were added 1,000 ml. of water and 2 grams of "Protease 62" (a proteolytic enzyme commercially available from Rohm and Haas). A magnetic stirrer was used to stir the mixture. Portions of 1N KOH solution were added periodically to maintain the pH of the mixture at 8-9 thus maximizing the rate of enzymatic hydrolysis. The hydrolysis continued for 18 hours and the solution was then brought to the boiling point to destroy the enzyme. The water was then evaporated to yield a dry soluble mixture of peptides and amino acids.

EXAMPLE 4

Plant containers were prepared according to the procedure of Example 1 using the following composition to impregnate and coat the cellulosic fiber nonwoven web:

|  | Parts |
|---|---|
| Hide glue | 24 |
| Glycerol | 8 |
| Degradaded proteins from Example 3 | 10 |

The core members (carbon-to-nitrogen ratio of less than 12 to 1) were then encapsulated in 70 parts of paraffin wax and subsequently used for growing corn according to the same procedure as described in Example 1. The corn plants, which were as green and vigorous as the corn plants in Example 1, attained a height of about 30 cm. within six weeks.

EXAMPLE 5

A set of plant containers having core members composed of a cellulosic fiber nonwoven web impregnated with 120 parts of dextrin, 8 parts of glycerine, and 10 parts of degraded protein (from Example 3) were prepared and tested according to the same procedure used in Example 1. After six weeks the corn had reached an average height of about 16 cm. Again the plants were yellowish and spindly like those in Example 2. In this example, as in Example 2, the carbon-to-nitrogen ratio in the biodegradable core was greater than 12:1 and the corn plants did not grow as well as in the other examples where the carbon-to-nitrogen ratio was less than 12:1.

EXAMPLE 6

A set of plant containers was made in the same manner as Example 1, except that the nutrient core comprised 25 parts of hide glue, 12.5 parts of glycerol, and 5 parts of dibasic potassium phosphate. The resulting carbon-to-nitrogen ratio of the core members was less than 12 to 1. The plant containers were tested using corn plants as in previous examples. After about six weeks growth, the corn was green and vigorous and had attained a height of about 50 cm.

EXAMPLE 7

A solution comprising 100 parts of hide glue, 20 parts of glycerol, and 20 parts dibasic potassium phosphate in 200 parts of water was cast over a layer of cheesecloth (20 grams per square meter) laying on a piece of paper release liner. After cooling and setting up, the reinforced protein film was cut into 6 cm. × 75 cm. strips and formed into arrays of tubes similar to that shown in FIG. 2. The carbon-to-nitrogen ratio of the core members was less than 12 to 1. After air drying overnight, the core members were encapsulated in a paraffin wax shell.

The tubes were filled with a 50/50 mixture of moist sand and vermiculite, innoculated with a small portion of garden soil and a kernel of corn was planted in each one. The approximate composition of the plant container tubes is calculated to be 50% hide glue, 10.4% glycerine, 10.4% dibasic phosphate, 4.5% cheesecloth and 22.7% wax encapsulant.

EXAMPLE 8

A hot solution of 150 parts of hide glue, 30 parts of glycerol and 30 parts of dibasic potassium phosphate was cast on release paper and allowed to gel to form a 20 mil thick film of pliable nutrient material. The film was cut into 6 cm. × 75 cm. strips and molded to form tubes having the configuration shown in FIG. 2. After air drying overnight, the array of nutrient tubes was encapsulated in the paraffin wax described in Example 1.

The plant container tubes were filled with a 50/50 mixture of moist sand and vermiculite and a kernel of corn was planted in each one. After two weeks of standing in a shallow dish of water the corn had started to sprout and the tubes were holding together well except for a few chips of the encapsulant being broken away by the swelling of the tube walls in the presence of moisture. The composition of these plant container tubes is calculated to be approximately 58% protein material, 11.7% glycerine, 11.7% dibasic potassium phosphate, and 18.6% wax encapsulant.

What is claimed is:

1. A bio-active plant container comprising:
   a. a nutrient core member which has walls comprising:
      i. about 30–70 percent by weight of water-soluble, film-forming proteinaceous material,
      ii. about 10–20 percent by weight of carbohydrate,
      iii. about 5–15 percent by weight of phosphate salt, and
      iv. about 0–30 percent by weight of fibrous material, wherein the carbon-to-nitrogen ratio in said nutrient core member is less than about 12 to 1; and
   b. a frangible, water-insoluble shell encapsulating the walls of said nutrient core member.

2. A plant container in accordance with claim 1 wherein said core member comprises about 30–70 percent by weight of hide glue, gelatin, casein, or mixtures thereof.

3. A plant container in accordance with claim 2 wherein said carbohydrate comprises glycerine.

4. A plant container in accordance with claim 2 wherein said phosphate salt is selected from the group consisting of $K_2HPO_4$, $K_3PO_4$, $KH_2PO_4$, and $Ca_3(PO_4)_2$.

5. A plant container in accordance with claim 2 wherein said fibrous material comprises wood pulp fiber and represents about 10 to 30 percent by weight of said core member.

6. A plant container in accordance with claim 2 wherein said carbohydrate comprises glycerine and said phosphate salt is selected from the group consisting of $K_2HPO_4$, $K_3PO_4$, $KH_2PO_4$, and $Ca_3(PO_4)_2$.

7. A plant container in accordance with claim 2 wherein said shell comprises a blend of paraffin wax and microcrystalline wax.

8. A plant container in accordance with claim 1 wherein said shell comprises wax.

9. A method for transplanting a growing plant comprising:
   a. providing a plant container of claim 1 having a growing plant therein,
   b. fracturing the frangible shell of said plant container, and
   c. placing said plant container in soil in the desired environment.

* * * * *